(12) United States Patent  
Nagakubo et al.

(10) Patent No.: US 8,651,213 B2  
(45) Date of Patent: Feb. 18, 2014

(54) BRAKE DEVICE FOR SADDLED VEHICLE

(75) Inventors: Akira Nagakubo, Wako (JP); Kotaro Fujiyama, Wako (JP); Satoru Ikami, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/635,848

(22) PCT Filed: Feb. 28, 2011

(86) PCT No.: PCT/JP2011/001146  
§ 371 (c)(1),  
(2), (4) Date: Sep. 18, 2012

(87) PCT Pub. No.: WO2011/114631  
PCT Pub. Date: Sep. 22, 2011

(65) Prior Publication Data  
US 2013/0009378 A1  Jan. 10, 2013

(30) Foreign Application Priority Data  
Mar. 19, 2010  (JP) ................................ 2010-064198

(51) Int. Cl.  
*B62D 61/02*  (2006.01)

(52) U.S. Cl.  
USPC ........... 180/218; 180/219; 180/220; 303/137; 303/9.64

(58) Field of Classification Search  
USPC .................... 180/218–220; 303/137, 9.64  
See application file for complete search history.

(56) References Cited

U.S. PATENT DOCUMENTS

| | | | |
|---|---|---|---|
| 8,167,382 B2 * | 5/2012 | Tahara et al. | 303/9.64 |
| 8,418,793 B2 * | 4/2013 | Yano et al. | 180/219 |
| 2005/0134114 A1 * | 6/2005 | Asahi | 303/137 |
| 2007/0199757 A1 | 8/2007 | Toyoda | |
| 2009/0243378 A1 * | 10/2009 | Ito et al. | 303/28 |
| 2009/0243381 A1 | 10/2009 | Tahara et al. | |
| 2011/0031054 A1 * | 2/2011 | Matayoshi | 180/227 |

FOREIGN PATENT DOCUMENTS

| | | | |
|---|---|---|---|
| JP | 2005-59629 A | 3/2005 |
| JP | 2007-76555 A | 3/2007 |
| JP | 2007-223521 A | 9/2007 |
| JP | 2009-234533 A | 10/2009 |
| JP | 2009-241801 A | 10/2009 |
| JP | 2010-47232 A | 3/2010 |

* cited by examiner

*Primary Examiner* — Tashiana Adams  
*Assistant Examiner* — Marlon Arce  
(74) *Attorney, Agent, or Firm* — Birch, Stewart, Kolasch & Birch, LLP

(57) ABSTRACT

A braking device of a saddle-ride type vehicle that can reduce a load acting on a joint is provided.

A joint 200 at a front-wheel brake output side which connects a metal pipe and a flexible brake hose is mounted on a body frame 2 via a mount rubber 260 under a floating state.

18 Claims, 12 Drawing Sheets

BRAKE DEVICE FOR SADDLED VEHICLE

TECHNICAL FIELD

The invention relates to a braking device of a saddle-ride type vehicle.

BACKGROUND ART

In a hydraulic braking device of a motorcycle, structure provided with an ABS modulator is known. In the structure, a brake piping for a front wheel that connects the ABS modulator and a brake for a front wheel is configured by a metal pipe connected to the ABS modulator and a flexible brake hose connected to the brake for the front wheel, and the metal pipe and the brake hose are connected via a joint supported by a body frame (for example, refer to a patent literature 1).

CITATION LIST

Patent Literature

Patent Literature 1 JP-A No. 2009-234533

SUMMARY OF INVENTION

Technical Problem

However, in conventional type configuration, as the ABS modulator is mounted in a floating state off the body frame for a measure for vibration and the joint is directly (rigidly) supported by the body frame, relative displacement is liable to act on the joint via the metal pipe when the ABS modulator is relatively displaced for the body frame because of the vibration of a vehicle body. Therefore, the strength of the joint is required to be enhanced and the increase of weight and costs is caused.

The invention is made in view of the above-mentioned situation and its object is to provide a braking device of a saddle-ride type vehicle that enables reducing a load which acts on a joint.

Solution to Problem

To achieve the object, the invention is based upon a braking device of a saddle-ride type vehicle which is provided with a body frame (2), a steering unit (20) steerably supported by the body frame (2), a front wheel (19) rotatably supported by the steering unit (20), a front wheel brake (101) that brakes the front wheel (19), an ABS modulator (88) that is mounted in a floating state off the body frame (2) and controls the braking force of the front wheel brake (101), front wheel brake pipings (107B, 109, 91, 92) that connect the ABS modulator (88) and the front wheel brake (101) and in which the front wheel brake pipings include metal pipes (107B, 91) connected to the ABS modulator (88), flexible brake hoses (109, 92) connected to the front wheel brake (101) and a joint (200) that is supported by the body frame (2) and connects the metal pipe (107B, 91) and the brake hose (109, 92), and has a feature that the joint (200) is mounted in a floating state off the body frame (2) via an elastic member (260).

According to this configuration, as the joint that connects the metal pipe and the brake hose is mounted in the vicinity of the body frame via the elastic member in a floating state, the ABS modulator and the joint are mounted in a floating state off the body frame, the whole braking device can be detached from the vibration of the body frame, and a load that acts on the joint can be reduced.

In the above-mentioned configuration, the joint (200) connects plural pairs of the metal pipe (107B, 91) and the brake hose (109, 92), the joint is held by a single support stay (250), and the elastic member (260) may be also provided between the support stay (250) and the body frame (2).

According to this configuration the support stay and the elastic member can be shared between/among the plural pairs of the metal pipe and the brake hose and the number of parts can be reduced.

Besides, in the above-mentioned configuration, the joint (200) is mounted in a floating state off the body frame (2) via an elastic member (260), and fixed by a support structure, such that a relative displacement of the joint (200) with respect to the body frame (2) in a direction parallel to an axis (L10) of the head pipe (11) of the vehicle is permitted by the elastic member (260), and a relative displacement of the body frame (2) in directions perpendicular to the axis of the head pipe (11) that varies a distance between the joint and the steering unit (20) is not permitted.

According to the support structure, the braking device can be detached from the vertical vibration of the body frame, when the steering unit is steered, a position of the joint which is a base of the brake hose is unchanged for the steering unit, and the brake hose can be set to short length, suitably separating the brake hose and the steering unit.

In this case, the joint (200) is fixed to the body frame (2) by a fastening member (265) extended in parallel with an axis (L10) of a head pipe (11) provided to a front end of the body frame (2) and the elastic member (260) is extended in a direction perpendicular to the axis (L10) of the head pipe (11).

In the above-mentioned configuration, the steering unit (20) is provided with a steering stem (21) rotatably supported by the head pipe (11) provided to the front end of the body frame (2), a bridge member (22) fixed to the steering stem (21) and a pair of right and left front forks (24) that are fixed to the bridge member (22) and support the front wheel (19), and the joint (200) may be also fixed to the downside of the steering stem (21).

According to this configuration, as the joint is arranged on the downside of the steering stem which is the rotational center of the steering unit, ease of the layout of the brake hose from the joint is enhanced, the interference with the front fork is reduced, and the brake hose can be set to short length.

In the above-mentioned configuration, the body frame (2) is provided with right and left backward extended parts (13) extended on the right side and on the left side backward from the head pipe (11), a plate (231) is provided to a triangular area encircled by the right and left backward extended parts (13) and the head pipe (11), and the joint (200) may be also fixed to the plate (231).

According to this configuration, as the joint is fixed to the plate provided to the area encircled by the right and left backward extended parts and the head pipe, the joint can be fixed in the vicinity of the head pipe without increasing the number of parts.

In the above-mentioned configuration, the joint (200) is suspended from the body frame (2) in parallel with an axial direction of the head pipe (11) and the brake hoses (109, 92) connected to the joint (200) may be also extended in a direction perpendicular to the axis (L10) of the head pipe (11).

According to this configuration, as the brake hose connected to the joint suspended from the body frame is extended in the direction perpendicular to the axis of the head pipe, the joint and the base of the brake hose can be arranged possibly near to the head pipe and the whole vehicle can be compacted.

In the above-mentioned configuration, the metal pipe (107B, 91) may be also locked to the body frame (2) by a locking member (215) made of resin.

According to this configuration, as the metal pipe is locked to the body frame by the locking member made of resin more flexible than the metal pipe, relative displacement between the body frame and the metal pipe can be absorbed by the locking member to some extent, a load on the metal pipe is reduced, and the metal pipe can be lightened.

Besides, in the above-mentioned configuration, a front wheel brake control device (108) that adjusts the operating timing of the front wheel brake (101) is provided and the front wheel brake control device (108) may be also fixed to an arm-shaped support stay (221) extended backward from the plate (231). According to this configuration, the front wheel brake control device can be fixed utilizing the plate.

In the above-mentioned configuration, a fastening member (223) that fixes the front wheel brake Control device (108) to the support stay (221) is provided and an axis (L11) of the fastening member (223) may also pass inside the body frame (2) in a view in the axial direction of the head pipe (11). According to this configuration, access to the fastening member is facilitated, work for detaching the front wheel brake control device is facilitated, the ease of assembly is enhanced, and the productivity is enhanced.

Advantageous Effects of Invention

In the invention, as the joint that connects the metal pipe and the brake hose is mounted in the vicinity of the body frame via the elastic member in a floating state, the whole braking device can be detached from the vibration of the body frame and a load on the joint can be reduced.

Besides, the joint connects the plural pairs of the metal pipe and the brake hose and is held by the single support stay, when the elastic member is provided between the support stay and the body frame, the support stay and the elastic member can be shared between/among the plural pairs of the metal pipe and the brake hose, and the number of parts can be reduced.

Further, the joint is mounted in a floating state off the body frame via an elastic member, and fixed by a support structure, such that a relative displacement of the joint with respect to the body frame in a direction parallel to an axis of the head pipe of the vehicle is permitted by the elastic member, and a relative displacement of the body frame in directions perpendicular to the axis of the head pipe that varies a distance between the joint and the steering unit is not permitted. Moreover, the braking device can be detached from the vertical vibration of the body frame and the brake hose can be set to short length, suitably separating the brake hose and the steering unit.

In this case, the joint is fixed to the body frame by the fastening member extended in parallel with the axis of the head pipe provided to the front end of the body frame and the elastic member may be also extended in the direction perpendicular to the axis of the head pipe.

The steering unit is provided with the steering stem rotatably supported by the head pipe, the bridge member fixed to the steering stem and the pair of right and left front forks that are fixed to the bridge member and support the front wheel, if the joint is fixed to the downside of the steering stem, the ease of the layout of the brake hose from the joint is enhanced, the interference with the front fork is reduced, and the brake hose can be set to short length.

Besides, the body frame is provided with the right and left backward extended parts extended on the right side and on the left side backward from the head pipe, the plate is provided in the triangular area encircled by the right and left backward extended parts and the head pipe, and when the joint is fixed to the plate, the joint can be fixed in the vicinity of the head pipe without increasing the number of parts.

When the joint is suspended from the body frame in parallel with the axial direction of the head pipe and the brake hose connected to the joint is extended in the direction perpendicular to the axis of the head pipe, the joint and the base of the brake hose can be arranged possibly near to the head pipe and the whole vehicle can be compacted.

When the metal pipe is locked to the body frame by the locking member made of resin, relative displacement between the body frame and metal pipe can be absorbed by the locking member to some extent, a load on the metal pipe is reduced, and the metal pipe can be lightened.

When the front wheel brake control device that adjusts the operating timing of the brake for the front wheel is fixed to the arm-shaped support stay extended backward from the plate, the front wheel brake control device can be fixed utilizing the plate.

When the axis of the fastening member that fixes the front wheel brake control device to the support stay passes inside the body frame in the view in the axial direction of the head pipe, access to the fastening member is facilitated, work for detaching the front wheel brake control device can be facilitated, the ease of assembly is enhanced, and the productivity is enhanced.

DESCRIPTION OF EMBODIMENT

Figure 1:
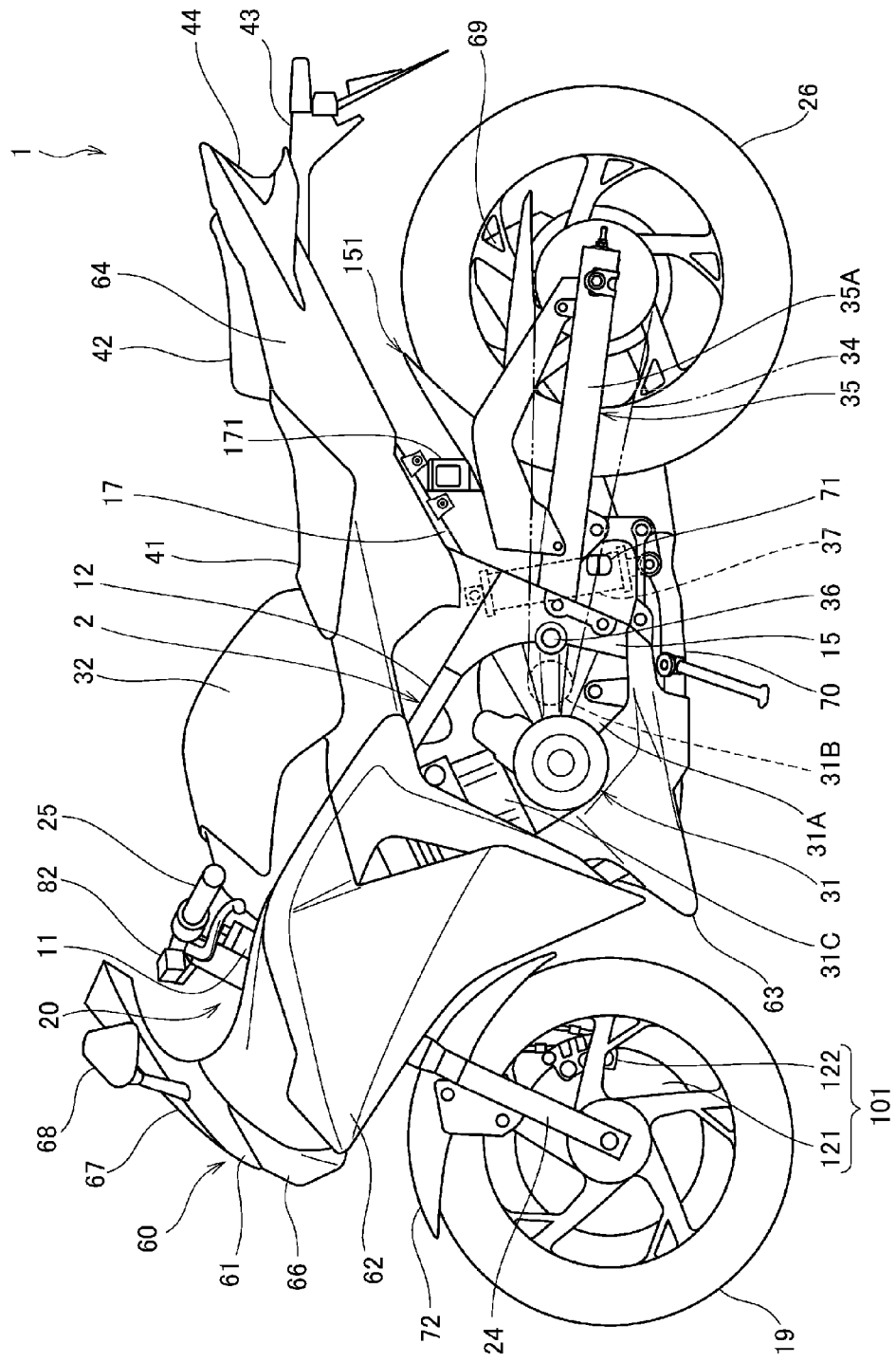
FIG. 1 is a left side view showing a motorcycle disclosed in an embodiment of the invention.

Referring to the drawings, one embodiment of the invention will be described below. In the description, a direction such as forward, backward, rightward, leftward, upward and downward shall be the same as a direction in a vehicle body unless it is especially described.

Figure 2:
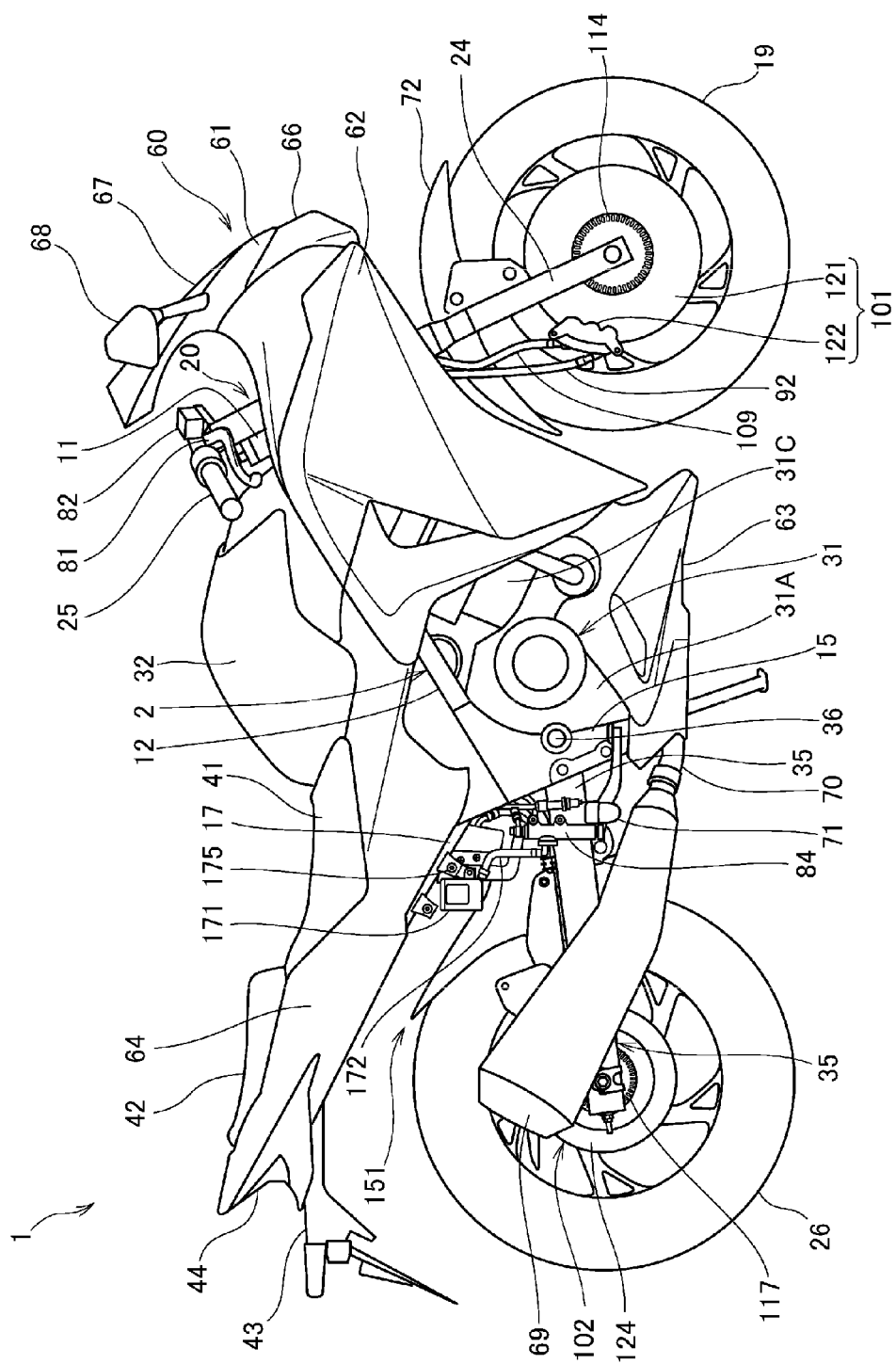
FIG. 2 is a right side view showing the motorcycle.

FIG. 1 is a left side view showing a motorcycle 1 disclosed in the embodiment of the invention. FIG. 2 is a right side view showing the motorcycle 1 and FIG. 3 shows a body frame 2 together with braking structure.

Figure 3:
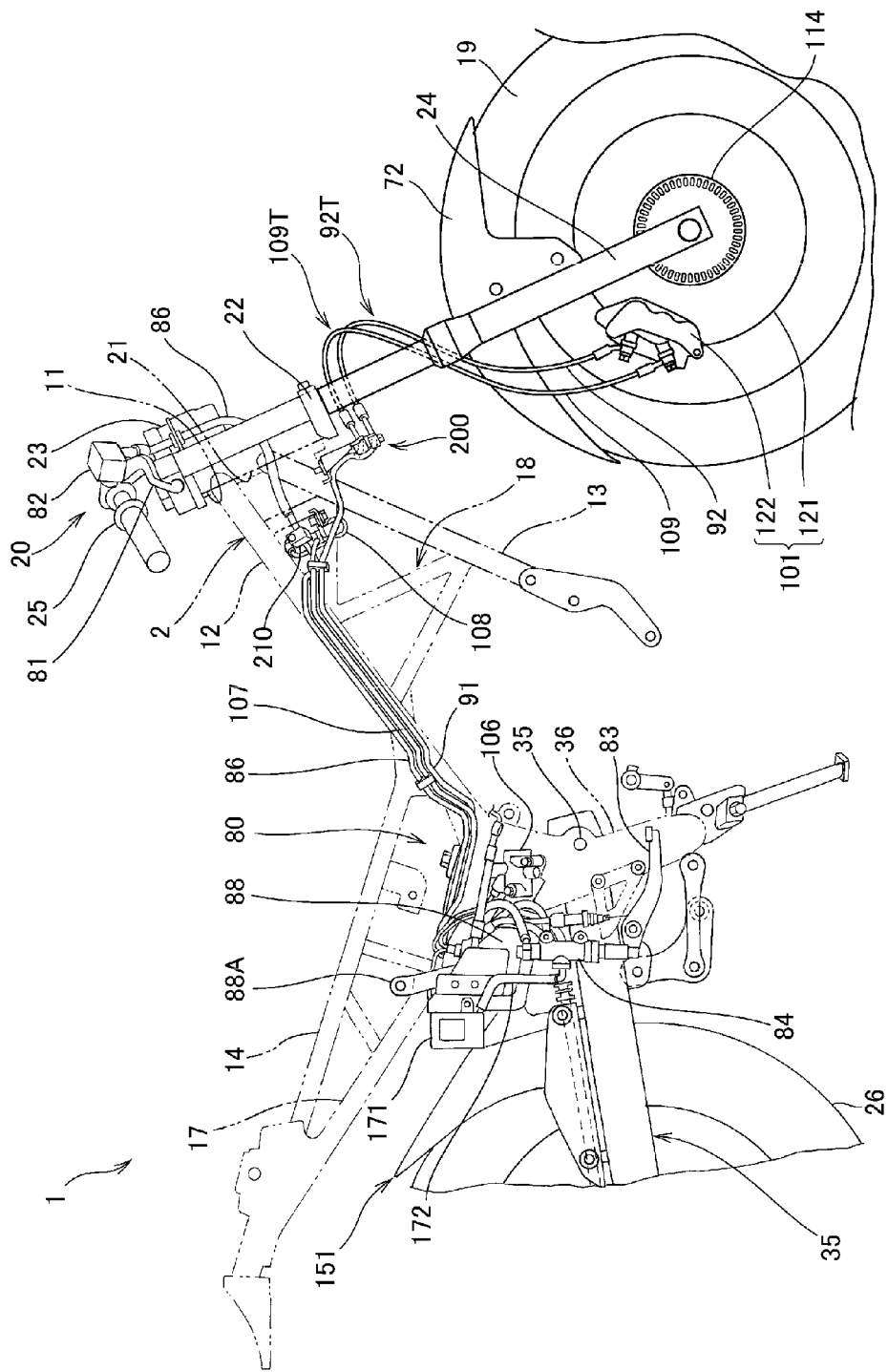
FIG. 3 shows a body frame together with braking structure.

As shown in FIGS. 1 to 3, the body frame 2 of the motorcycle 1 is provided with a head pipe 11 arranged at its front end, a pair of right and left main frames 12 extended backward and downward from the right side and from the left side of an upper part of the head pipe 11, a pair of right and left down frames 13 (see FIG. 3) extended backward and downward on the downside of each main frame 12 from the right side and from the left side of a lower part of the head pipe 11, a pair of right and left rear frames (also called seat rails) 14 (see FIG. 3) extended backward and upward from the rear of each main frame 12 and a pair of right and left pivot plates 15 extended downward from the rear of each main frame 12.

The body frame 2 is further provided with a pair of right and left rear frames for reinforcement 17 (see FIG. 3) extended backward and upward from upper parts of the pivot plates 15 and connected to the rear frames 14 and plural reinforcing frames 18 (see FIG. 3) that link the main frame 12 and the down frame 13.

The head pipe 11 supports a steering unit 20 that steers a front wheel 19. The steering unit 20 is provided with a steering stem 21 rotatably supported by the head pipe 11, a lower bridge member (also called an under bridge) 22 fixed to a lower part of the steering stem 21, an upper bridge member (also called a top bridge) 23 fixed to an upper part of the steering stem, a pair of right and left front forks 24 supported by the upper and lower bridge members 22, 23 and a handlebar 25 attached to the upper bridge member 23 as shown in FIG. 3, and the front wheel 19 supported by lower ends of the front forks 24 by the operation of the handlebar by a rider is laterally steered.

The main frame 12 is a frame that supports an engine 31 which is an internal combustion engine, a fuel tank 32 and peripheral parts of these main parts and the engine 31 is supported by the downside of the main frame 12, the rear of the down frame 13 and the front of the pivot plate 15. Hereby, the engine 31 is suspended in a lower part of the center in a longitudinal direction of the body frame 2.

An engine output shaft 31B is provided to the rear on the left side of a crankcase 31A of the engine 31 as shown in FIG. 2. The engine output shaft 31B and a rear wheel 26 are coupled via a drive chain (hereinafter called a chain) 34 to enable the transmission of power and the power of the engine 31 is transmitted to the rear wheel 26 via the chain 34.

A pivot 36 that turnably journals front ends of a pair of right and left swing arms 35 is supported by intermediate parts in a vertical direction of the pivot plates 15 with the pivot piercing the intermediate parts. The pivot 36 is arranged in parallel to a direction of vehicle width and vertically swingably supports the swing arm 35 using the pivot 36 as a fulcrum. A single rear cushion 37 (see FIG. 1) is interposed between the swing arm 35 and the body frame 2.

The pair of right and left rear frames 14 support an occupant seat 41 for which a rider is seated and an occupant seat 42 for which pillion passenger is seated at an interval in a longitudinal direction and support a rear fender on the rear side 43, rear lamps 44 and others at the back of the occupant seat 42.

A fuel tank 32 is arranged in front of the occupant seat 41 for a rider and the engine 31 is arranged on the downside of the fuel tank 32. The main frames (the head pipe 11, the main frame 12, the down frame 13, the rear frame 14 and the rear frame for reinforcement 17) except the pivot plate 15 of the body frame 2 are formed by a metal pipe made of metallic materials such as a steel product and the pivot plate 15 is formed by a plate member made of metallic materials.

As shown in FIGS. 1 and 2, the motorcycle 1 is provided with a body cowl (also called a body cover) 60 that covers the vehicle body.

The body cowl 60 is formed in a full cowling type that covers the substantially whole of the vehicle body and is provided with a front cowl 61 that covers the front of the vehicle body, a pair of right and left side cowls 62 which are connected to the front cowl 61 and cover the right side and the left side of the vehicle body, a lower cowl 63 that covers the downside of the vehicle body and a pair of right and left rear cowls 64 that cover the rear of the vehicle body.

The front cowl 61 is provided in front of the head pipe 11 and the main frame 12, and a headlight 66, a wind screen 67, a pair of right and left rear view mirrors 68 and others are attached to the front cowl.

The side cowls 62 are coupled to the front cowl 61 and cover the right side and the left side of the front of the body frame 2 and the right side and the left side of the front (a cylinder 31C) of the engine 31. The lower cowl 63 is coupled to a lower part of the side cowl 62 and covers the downside of the crankcase 31A of the engine 31.

An engine intake system is arranged at the back of the cylinder 31C of the engine 31. A muffler 69 is arranged on the downside of the rear of the body frame 2 and on the side (the right side) of the rear wheel 26 as shown in FIG. 2, an exhaust pipe 70 is connected between a front end of the muffler 69 and the cylinder 31C of the engine 31, and an engine exhaust system is configured by the exhaust pipe 70 and the muffler 69.

A reference sign 71 in FIG. 2 denotes a pair of right and left main steps for the rider to put rider's feet and 72 denotes a front fender that covers the upside of the front wheel 19.

The motorcycle 1 is provided with a hydraulic braking device 80.

Figure 4:
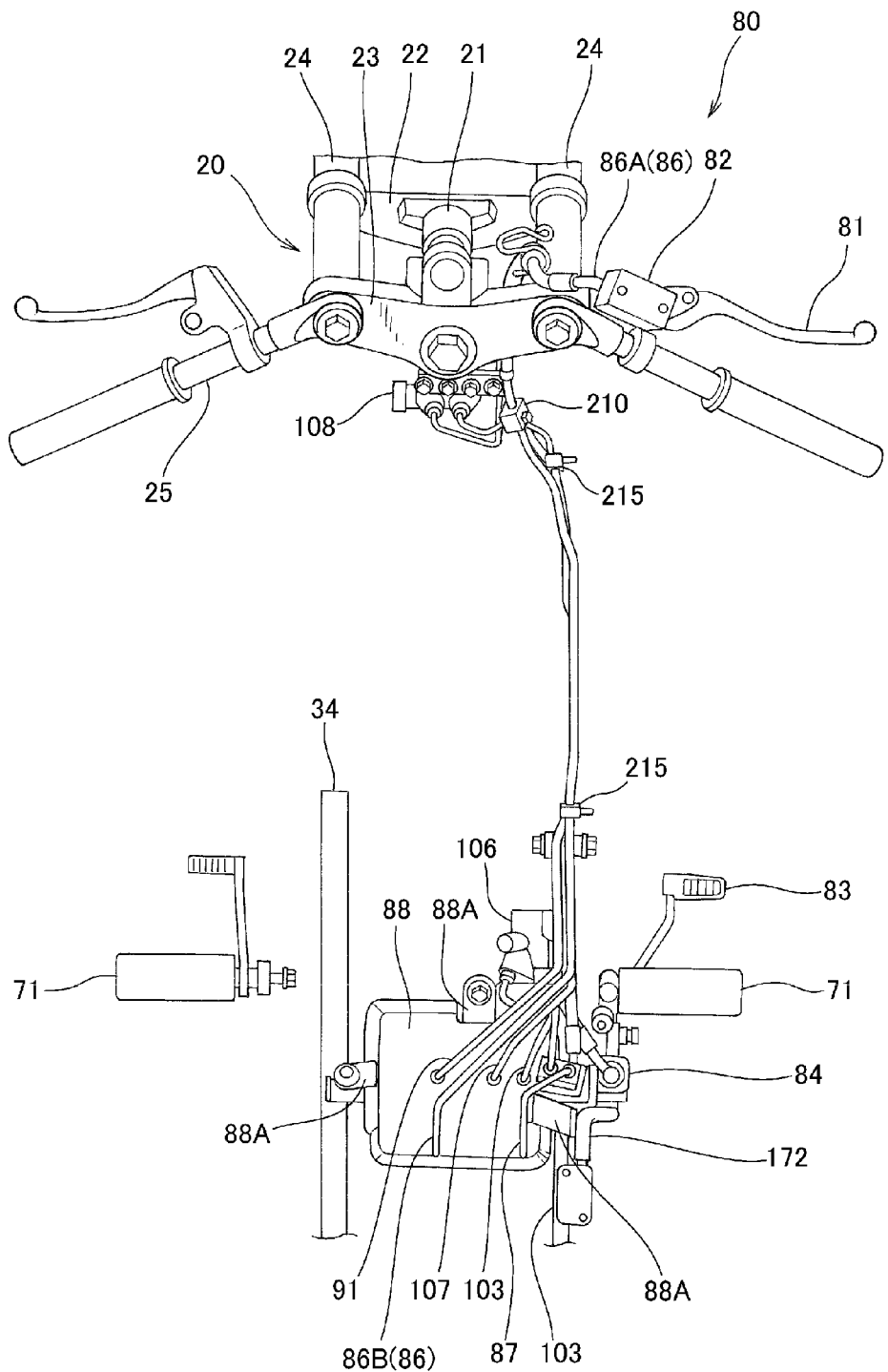
FIG. 4 is a top view showing a braking device together with its peripheral configuration.
Figure 5:
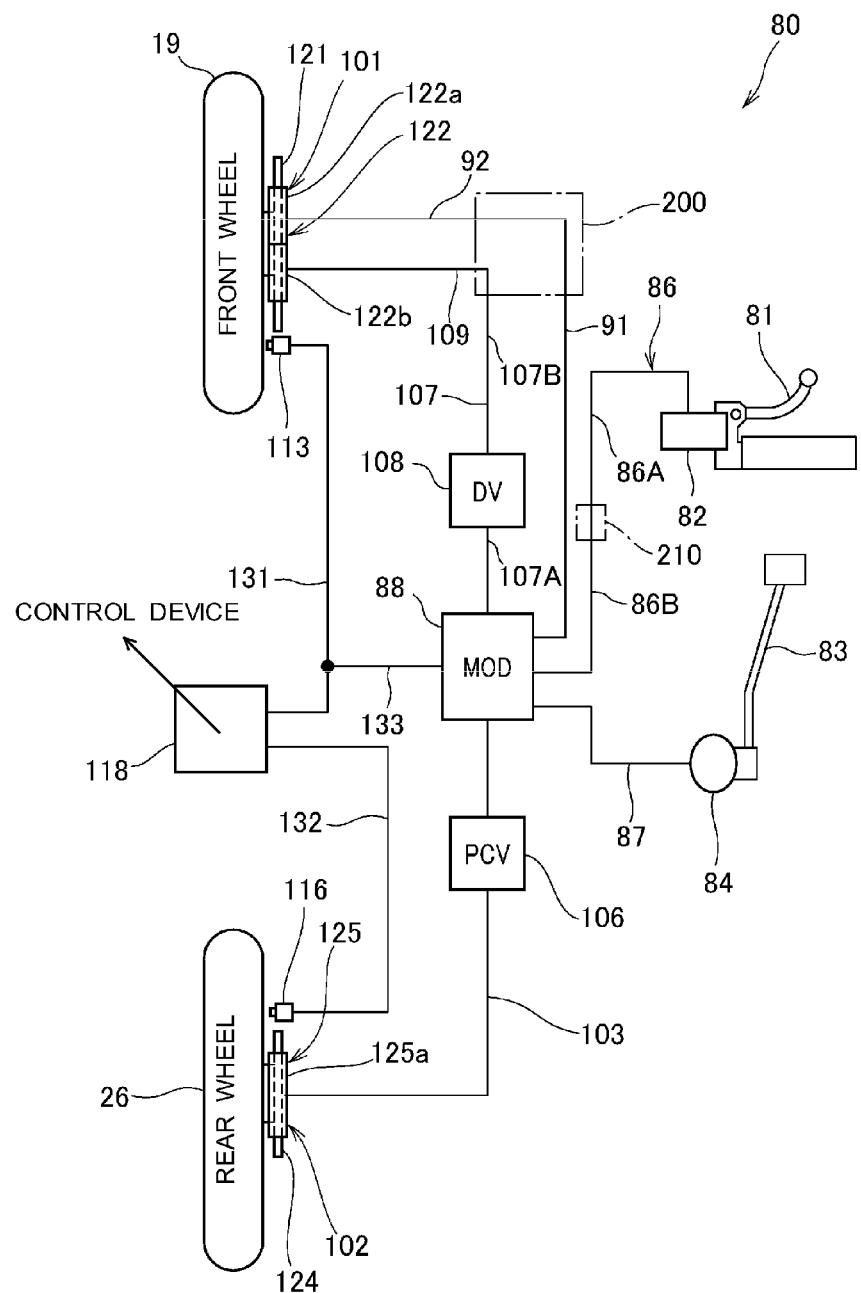
FIG. 5 shows the circuitry configuration of the braking device.

FIG. 4 shows the braking device 80 together with peripheral configuration viewed from the upside of the vehicle body and FIG. 5 shows the circuitry configuration of the braking device 80.

As shown in FIGS. 4 and 5, the braking device 80 is provided with a brake lever 81 as a brake operating tool attached to the handlebar 25, a master cylinder on the side of the lever 82 that generates braking hydraulic pressure by the operation of the brake lever 81, a brake pedal 83 as a brake operating tool attached to the vicinity of the main step 71, a master cylinder 84 on the side of the pedal that generates braking hydraulic pressure by operating the brake pedal 83, an ABS modulator 88 connected to the master cylinder 84 on the side of the pedal via pipings 86, 87 which are brake pipings for input, a front wheel brake 101 (a front brake) connected to the ABS module 88 via pipings 91, 92, 107, 109 which are brake pipings for output to the front wheel and a rear wheel brake (a rear brake) 102 connected to the ABS modulator 88 via pipings 103 to 105 as a brake piping for output to the rear wheel.

Further, the braking device 80 is provided with a pressure control valve (hereinafter called PCV) 106 provided on the way of the piping 103 connected to the rear wheel brake 102, a delay valve (DV) 108 provided on the way of the piping 107 as the brake piping for output connected to the front wheel brake 101 and the ABS modulator 88, a front wheel speed sensor 113 that detects the revolution speed (the wheel speed) of the front wheel 19, a rear wheel speed sensor 116 that detects the revolution speed (the wheel speed) of the rear wheel 26 and a control device 118 that controls the ABS modulator 88 based upon a signal from the wheel speed sensors 113, 116.

A reference sign 171 in the drawings denotes a reservoir tank for the master cylinder 84 on the side of the pedal, 172 denotes a piping for connecting the reservoir tank 171 and the master cylinder 84 on the side of the pedal, and 175 denotes a support stay for supporting the reservoir tank 171 by the rear frame for reinforcement 17.

The ABS modulator 88 controls the braking force of each brake 101, 102 by controlling the braking hydraulic pressure of the front wheel brake 101 and the rear wheel brake 102 under control by the control device 118 and functions as a braking force control device that prevents the front wheel 19 and the rear wheel 26 from being locked.

The ABS modulator 88 is substantially in the shape of a rectangular parallelopiped as shown in FIGS. 3 and 4, is attached to the body frame 2 via support stays 88A provided in the front, on the right side and on the left side of the ABS modulator 88, and is arranged in front of a rear fender on the front side 151 that covers the front and an upper part of the rear wheel 26, at the back of the rear cushion 37, under the occupant seat 41 and over the swing arm 35.

The ABS modulator 88 is a relatively heavy part because it is provided with an electric motor, a pump driven by the electric motor, plural brake fluid passages connected to the pump and plural solenoid valves each of which is provided on the way of the brake fluid passage. The mass of the motorcycle 1 can be concentrated by arranging the heavy part in the position, compared with a case that the heavy part is arranged at a front end or at a rear end of the motorcycle 1.

The front wheel brake 101 is a hydraulic disc brake forming the hydraulic braking device and is provided with a brake disc 121 attached to the side (the right side) of the front wheel 19 and rotated integrally with the front wheel 19 and a brake caliper 122 that brakes with the brake disc 121 between as shown in FIG. 1. The motorcycle 1 is configured in a single disc type provided with the hydraulic disc brake only on one side (on the right side) of the front wheel 19.

In the brake caliper 122, cylinders 122a, 122b into which a piston that presses a brake pad on the brake disc 121 is movably inserted are formed as shown in FIG. 5 and pipings 92, 109 are connected to each cylinder 122a, 122b.

A flexible brake hose such as a rubber hose is used for the pipings 92, 109 connected to the brake for the front wheel 191 to enable following the steering of the front wheel 19. These pipings 92, 109 formed by a brake hose are connected to the pipings 91, 107 which are a metal pipe routed on the side of the body frame 2 via a joint 200 on the side of output to the front brake (hereinafter called a joint on the side of FB output) provided on the side of the body frame 2.

The rear wheel brake 102 is a hydraulic disc brake forming the hydraulic braking device and is provided with a brake disc 124 attached to the side (the right side) of the rear wheel 26 and rotated integrally with the rear wheel 26 and a brake caliper 125 that brakes with the brake disc 124 between, and a single cylinder 125a into which a piston that presses a brake pad on the brake disc 124 is movably inserted is formed in the brake caliper 125.

A flexible brake hose such as a rubber hose is used for the piping 103 connected to the cylinder 125a of the rear wheel brake 102 to enable following a vertical motion of the rear wheel.

The PCV 106 functions as an interlocking brake control device that controls braking hydraulic pressure in the piping 103 connected to the rear wheel brake 102, when the brake pedal 83 is operated, the braking force of the rear wheel brake 102 is adjusted by the PCV 106, the front wheel brake 101 is operated in interlock with the operation of the rear wheel brake 102, and braking in which the front and rear wheels are interlocked is executed.

The delay valve 108 functions as a front wheel brake control device that adjusts the timing of the operation of the front wheel brake 101 and when braking in which the front and rear wheels are interlocked is executed, the supply of braking hydraulic pressure to the side of the front wheel brake 101 is retarded by the front wheel brake control device, compared with the side of the rear wheel brake 102.

The front wheel speed sensor 113 is a sensor that detects the speed of the front wheel using a pulser ring 114 (see FIG. 2) attached to the side (the right side) of the front wheel 19, wiring 131 extended from the front wheel speed sensor 113 is connected to the control device 118 and the ABS modulator 88, and an output signal from the sensor 113 is output to the control device 118 and the ABS modulator 88.

The rear wheel speed sensor 116 is a sensor that detects the speed of the rear wheel using a pulser ring 117 (see FIG. 2) attached to the side (the right side) of the rear wheel 26, wiring 132 extended from the rear wheel speed sensor 116 is connected to the control device 118, and an output signal from the sensor 116 is output to the control device 118.

The control device 118 acquires front wheel speed and rear wheel speed based upon signals from the front wheel speed sensor 113 and the rear wheel speed sensor 116 and controls the front wheel brake 101 and the rear wheel brake 102 based upon difference between the front wheel speed and the rear wheel speed to prevent the front and rear wheels from being slipped.

That is, in the braking device 80 of the motorcycle 1, when the brake pedal 83 is operated, the master cylinder 84 on the side of the pedal generates braking hydraulic pressure according to the operation of the brake pedal and the braking hydraulic pressure is supplied to the ABS modulator 88 via the piping 87.

In this case, the ABS modulator 88 operates the rear wheel brake 102 by supplying the braking hydraulic pressure from the ABS modulator 88 to the piping 103, the ABS modulator supplies the braking hydraulic pressure to the cylinder 122b of the front wheel brake 101 via the delay valve 108 by supplying the braking hydraulic pressure from the ABS modulator 88 to the piping 107 which is a flexible brake hose, and the ABS modulator operates the front wheel brake 101.

That is, braking in which the front and rear wheels are interlocked that simultaneously operates the front wheel brake 101 and the rear wheel brake 102 is executed.

In the braking, the control device 118 monitors front wheel speed and rear wheel speed and controls braking hydraulic pressure from the ABS modulator 88 to prevent the front wheel 19 and the rear wheel 26 from being locked.

In the meantime, when the brake lever 81 is operated, the master cylinder on the side of the lever 82 generates braking hydraulic pressure according to the operation of the brake lever 81 and the braking hydraulic pressure is supplied to the ABS modulator 88 via the piping 86.

In this case, the ABS modulator 88 supplies the braking hydraulic pressure to the cylinder 122a of the front wheel brake 101 via the piping 92 which is a flexible brake hose by supplying the braking hydraulic pressure from the ABS modulator 88 to the piping 91 which is a metal pipe, and the ABS modulator operates the front wheel brake 101.

To execute braking in which the front and rear wheels are interlocked when the brake level 81 is operated, the ABS modulator 88 further supplies braking hydraulic pressure adjusted in the ABS modulator 88 to the piping 103 and operates the rear wheel brake 102.

In the braking, the control device 118 also monitors front wheel speed and rear wheel speed and also controls the braking hydraulic pressure from the ABS modulator 88 to prevent the front wheel 19 and the rear wheel 26 from being locked.
<Braking Structure on Front Wheel Side>

The ABS modulator 88 of the motorcycle 1 is mounted in a floating state off the body frame 2 by interposing mounting rubber (not shown) made of an elastic member between each of the plural support stays 88A and the body frame 2 for a measure for vibration. Therefore, the transmission of vibration between the body frame 2 and the ABS modulator 88 is inhibited and the transmission of vibration on the side of the body frame to the ABS modulator can be mostly prevented. Conventional type structure that an ABS modulator is mounted in a floating state can be widely applied to the structure that the ABS modulator 88 is mounted in the floating state.

As the ABS modulator 88 is relatively displaced for the body frame 2 when the ABS modulator 88 is mounted in the floating state as described above, the relative displacement acts on the joint 200 on the side of FB output connected to the ABS modulator 88 via the metal pipe and a load is easily applied onto the joint 200. Then, in the motorcycle 1, the braking structure on the side of the front wheel is configured as follows.

Figure 6:
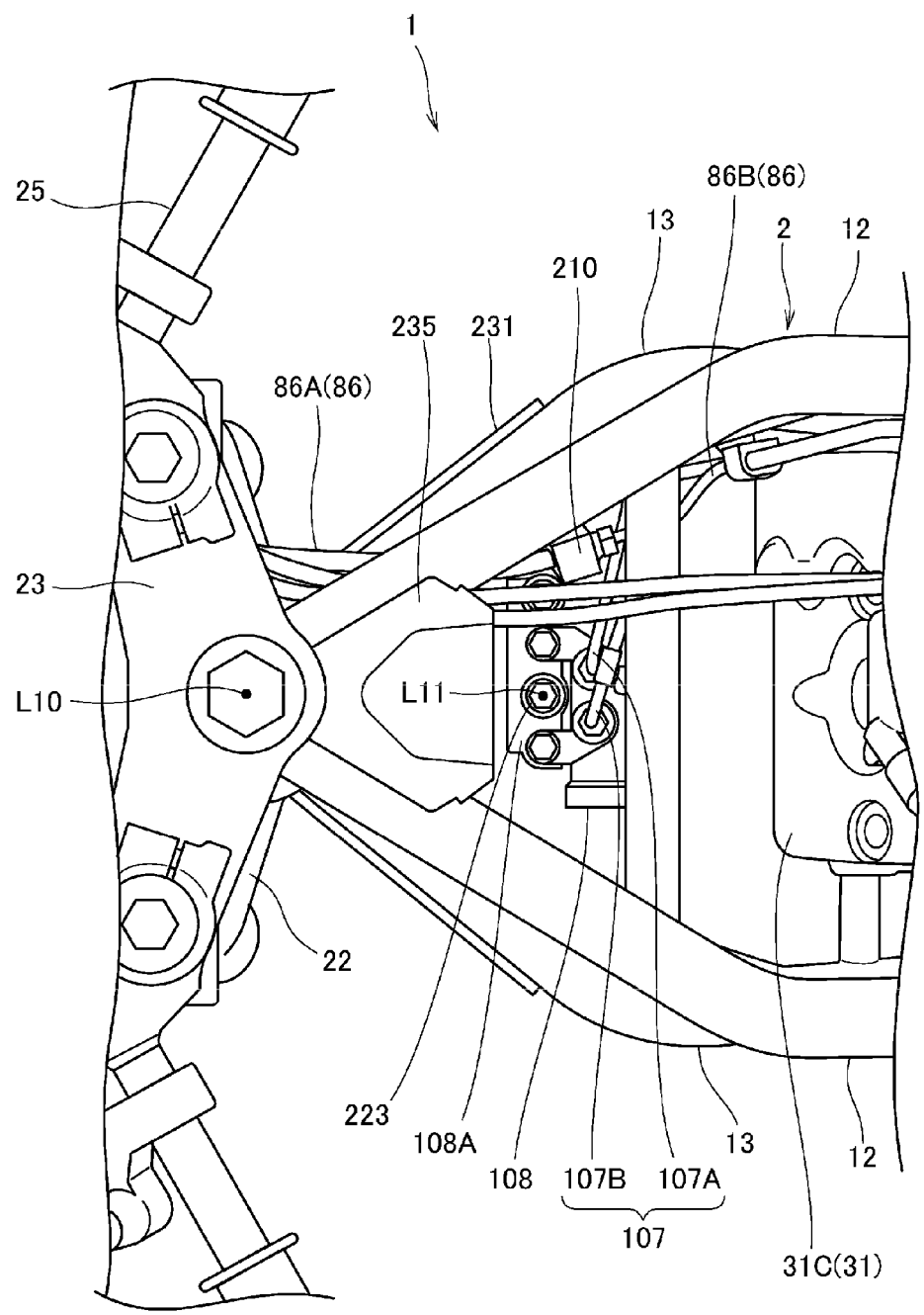
FIG. 6 is a top view showing the front of a vehicle body together with a brake piping.
Figure 7:
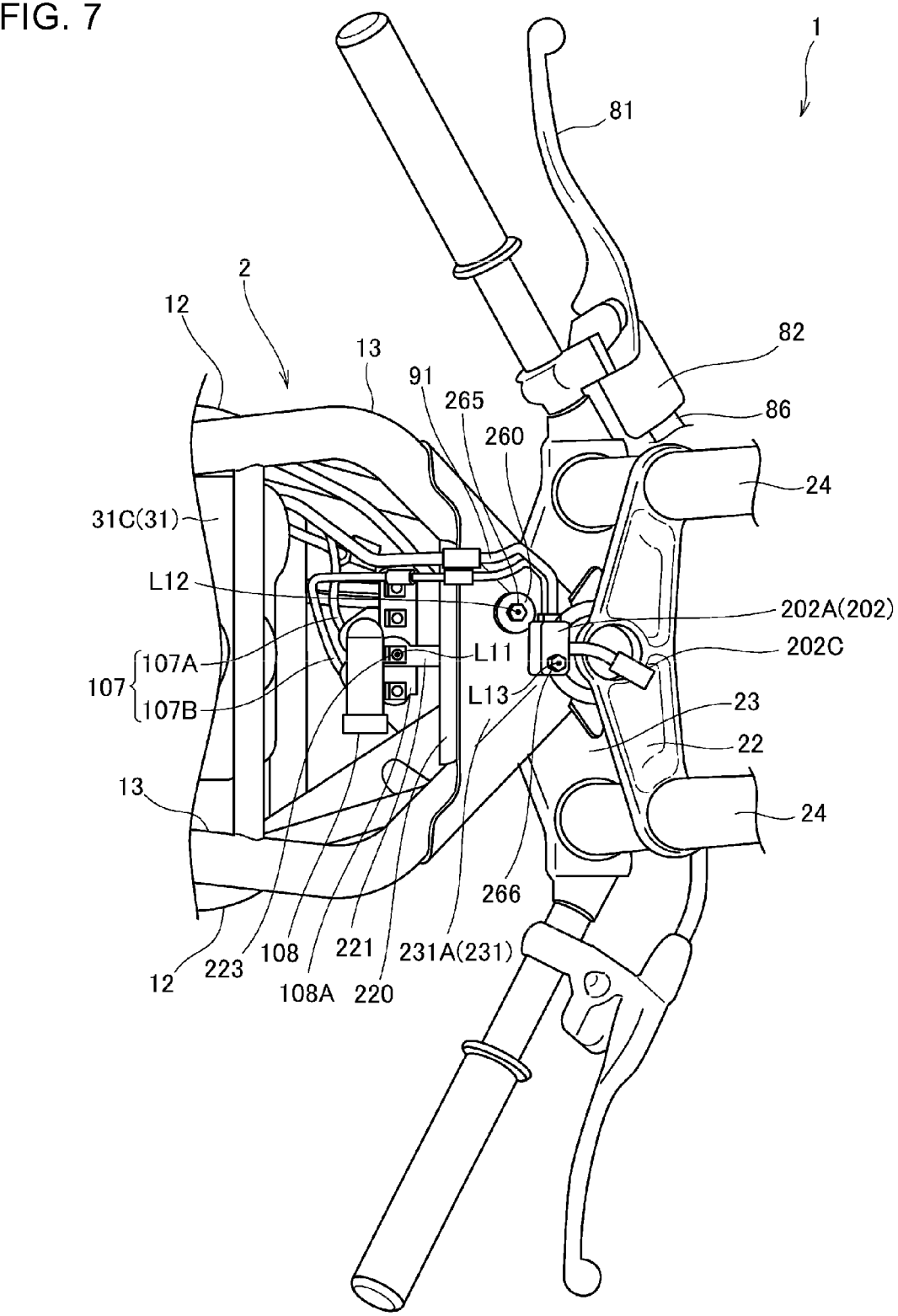
FIG. 7 is a bottom view showing the front of the vehicle body together with the brake piping.
Figure 8:
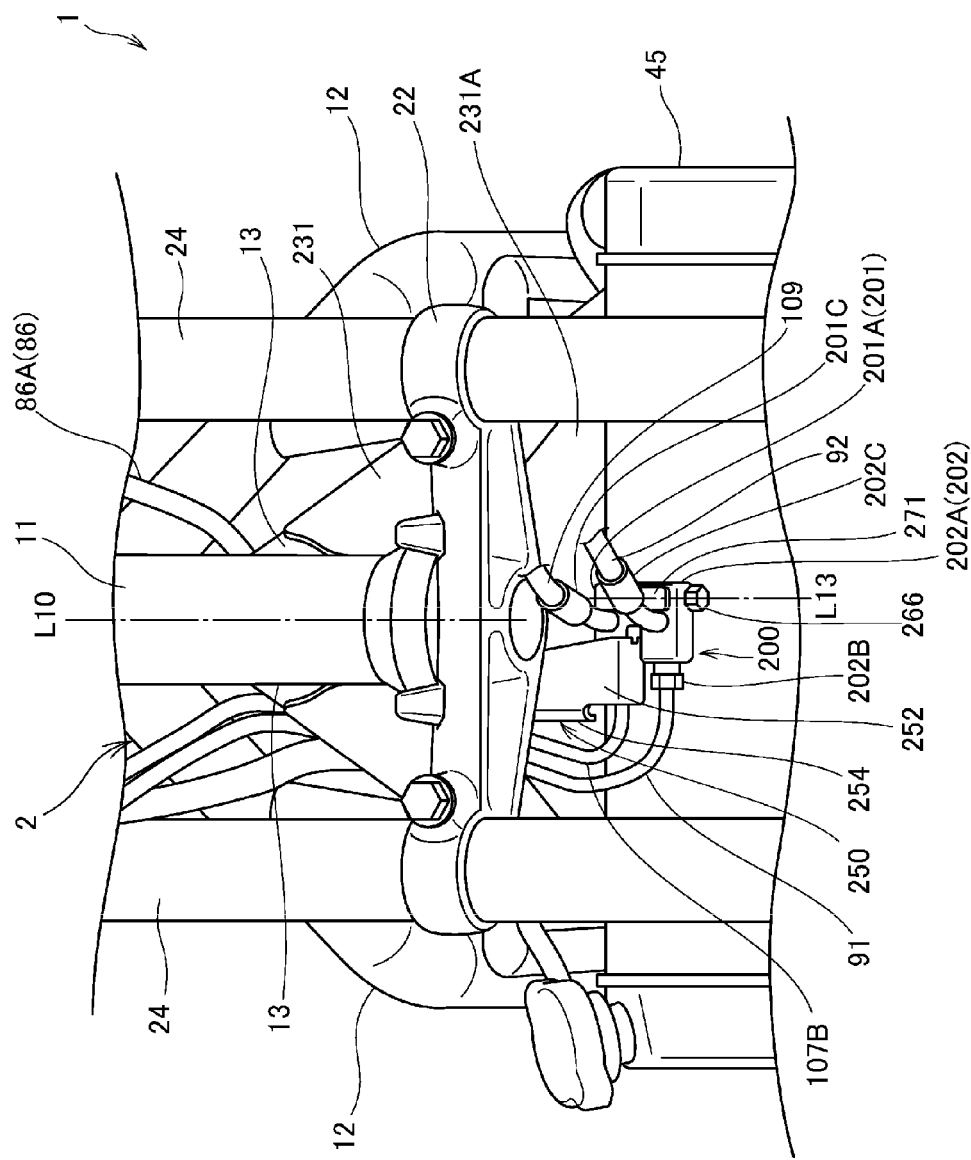
FIG. 8 is a front view showing the front of the vehicle body together with the brake piping.
Figure 9:
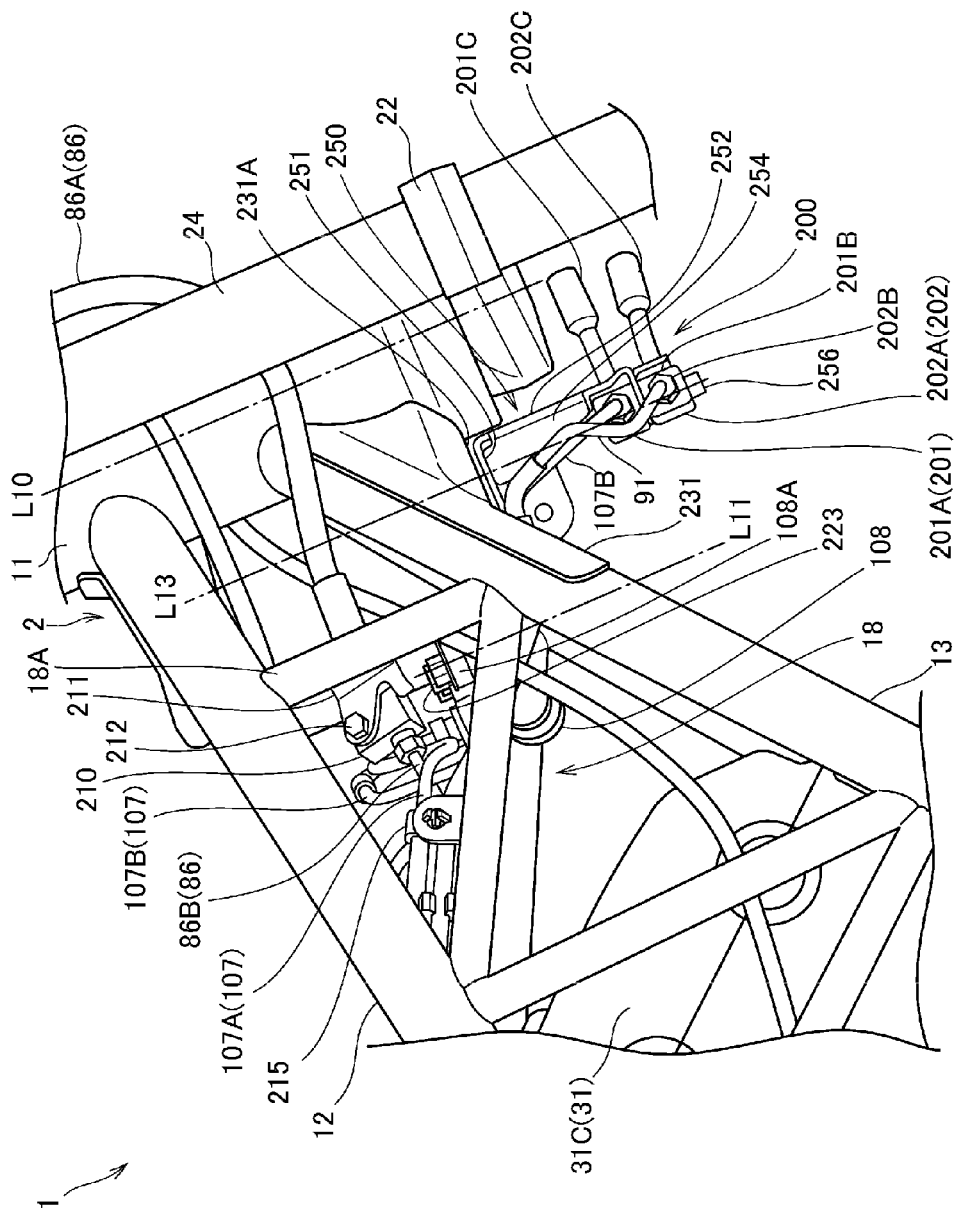
FIG. 9 is a right side view showing the front of the vehicle body together with the brake piping.
Figure 10:
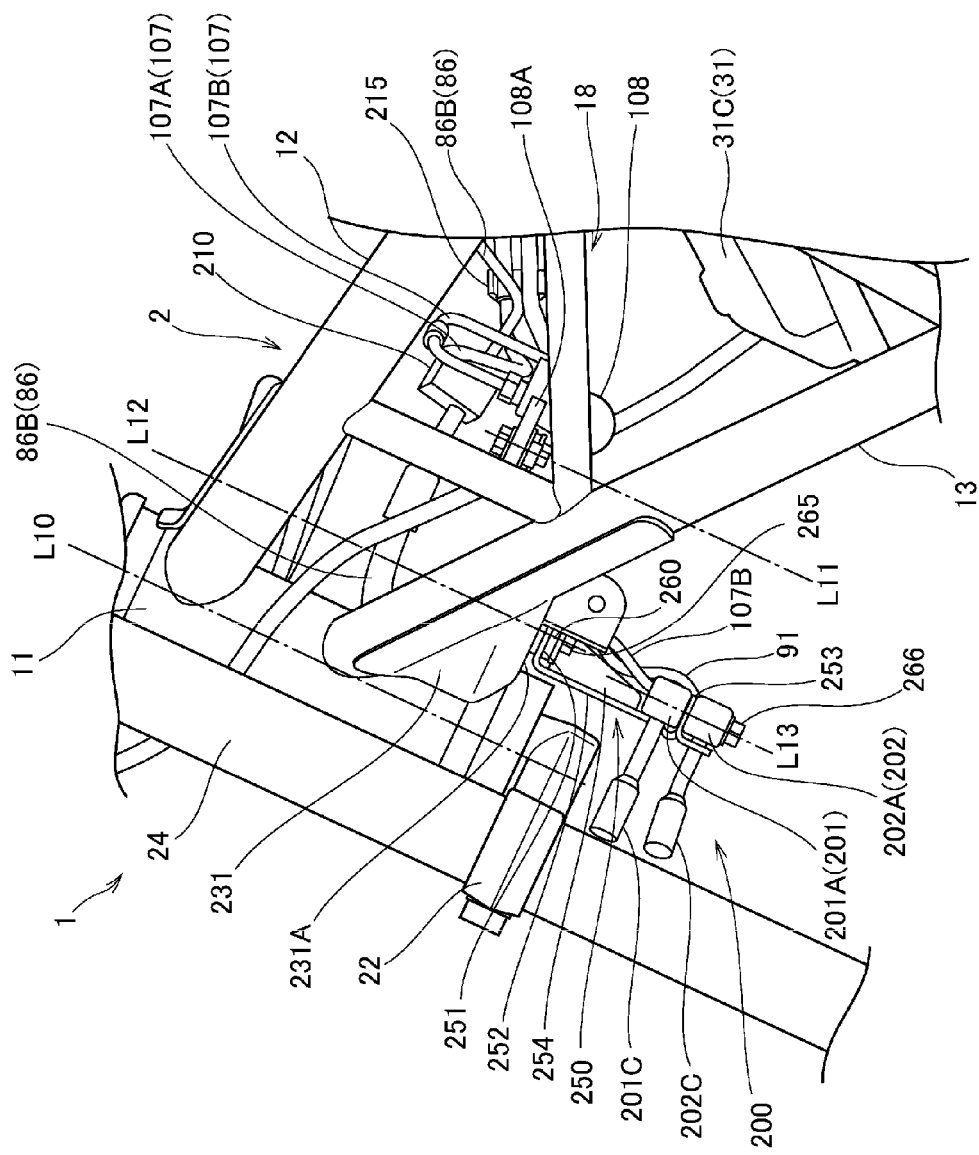
FIG. 10 is a left side view showing the front of the vehicle body together with the brake piping.

FIG. 6 is a top view showing the front of the vehicle body together with brake piping, FIG. 7 is a bottom view showing them, FIG. 8 is a front view showing them, FIG. 9 is a right side view showing them, and FIG. 10 is a left side view showing them. A reference sign L10 in the drawings denotes an axis of the head pipe 11. The engine 31 of the motorcycle 1 is a water-cooled type and as shown in FIG. 8, a radiator 45 for cooling engine cooling water is provided on the rear downside of the head pipe in front of the pair of right and left down frames 13.

The brake lever 81 for a rider to operate is provided on the right side of the handlebar 25 as shown in FIGS. 4 and 7, the master cylinder on the side of the lever 82 is provided at a base of the brake lever 81, and the piping 86 which is a brake piping for input is extended from the master cylinder on the side of the lever 82.

The piping 86 is provided with a first piping 86A fixed to the brake lever 81 and a second piping 86B connected to the ABS modulator 88 as shown in FIGS. 5 and 9, a flexible brake hose such as a rubber hose is used for the first piping 86A, a metal pipe is used for the second piping 86B, and the first piping 86A and the second piping 86B are connected via a joint on the side of input from the brake on the side of the front wheel (hereinafter called a joint on the side of FB input) 210 (see FIG. 9) provided on the front side of the vehicle body.

The joint on the side of FB input 210 is fixed to a stay 211 provided to the reinforcing frame 18A on the front side of the plural reinforcing frames 18 that cross-link the main frame 12 and the down frame 13 by a fastening member (a fastening bolt in this configuration) 213, the first piping 86A is connected to the front side of the joint on the side of FB input 210, and the second piping 86B is connected to the back side.

The second piping 86B which is a metal pipe is extended backward and downward along the inside in the direction of vehicle width of the right main frame 12 and is connected to the ABS modulator 88 as shown in FIGS. 3 and 4.

As shown in FIG. 4, pipings 97, 107 which are brake pipings for output to the front wheel and are a metal pipe are extended forward from the ABS modulator 88 and are extended forward and upward along the inside in the direction of vehicle width of the right main frame 12. That is, the two pipings 91, 107 which are the brake pipings for output to the front wheel and the single piping 86 which is the brake piping for input from the side of the front wheel are concentrated inside the main frame 12 in the direction of vehicle width on the same side (on the right side) in the direction of vehicle width to be compact (see FIG. 3).

In this configuration, the joint 200 on the side of FB output is provided in the vicinity of the head pipe 11 at the front end of the body frame 2 and the pipings 91, 107 which are a metal pipe are connected to the pipings 92, 109 formed by a flexible brake hose via the joint 200 on the side of FB output.

In this case, the pipings 91, 107 made of a metal pipe are locked to the body frame 2 (mainly, the right main frame 12) by a locking member 215 made of resin (see FIGS. 3 and 4) between the ABS modulator 88 and the joint 200 on the side of FB output. As the resin material is more flexible than the metal material used for the metal pipe, relative displacement between the body frame 2 and the metal pipes (the pipings 91, 107) can be absorbed to some extent by the locking member 215 and a load onto the metal pipe can be reduced.

In this case, as the delay valve 108 is provided on the way of the piping 107, the piping 107 is configured by a first piping 107A which connects the ABS modulator 88 and the delay valve 108 and which is a metal pipe and a second piping 107B which connects the delay valve 108 and the joint 200 on the side of FB output and which is a metal pipe.

The delay valve 108 is supported by a support stay 221 (see FIG. 7) provided on the side of the body frame 2.

The support stay 221 is provided to a reinforcing plate 231 joined to cover a triangular area encircled by a cross member 220 extended in the direction of vehicle width to connect the fronts of the right and left down frames 13, the pair of right and left down frames 13 and the head pipe 11 as shown in FIG. 7, and the support stay is formed in the shape of an arm extended from the center in the direction of vehicle width to the back of the cross member 220.

The delay valve 108 is fixed to the body frame 2 by placing a support plate 108A (see FIG. 6) provided to the delay valve 108 on a top face of the support stay 221, putting a fastening member (a fastening bolt in this configuration) 223 through the support plate 108A from the upside and fastening it to the support stay 221.

As shown in FIG. 9, an axis L11 of the fastening member 223 is parallel to the axis L10 of the head pipe 11 and the axis passes inside the body frame 2 with the axis apart from the head pipe 11, the pair of right and left main frames 12, the steering unit 20 and others in a view in an axial direction of the head pipe 11 as shown in FIGS. 6 and 7.

In this case, as the axis L11 of the fastening member 223 is coincident with a fastening axis of the fastening member 223, access to the fastening member 223 is facilitated in the view in the axial direction of the head pipe 11 and work for attaching and detaching the delay valve 108 can be facilitated. Besides, as an axial direction of the head pipe 11 is coincident with a direction of a telescopic motion of the front fork 24 when the axis L11 of the fastening member 223 is parallel to the axis L10 of the head pipe 11, the axis of the fastening member is coincident with a direction of a vertical motion of the front of the vehicle body and the strength in fixing of the delay valve 108 can be efficiently secured by the fastening member 223.

As shown in FIG. 7, the pair of right and left down frames 13 form right and left parts extended on the right side and on the left side backward from the head pipe 11 and the reinforcing plate 231 for enhancing the coupling rigidity of the down frame 13 and the head pipe 11 is joined to the triangular area encircled by the pair of right and left down frames 13 and the head pipe 11 by welding.

The reinforcing plate 231 is formed by metal materials such as a steel product, is extended backward and downward in a side view, and its bottom 231A forms a plane extended in a perpendicular direction to the axis L10 of the head pipe 11. A support stay 250 for supporting the joint 200 on the side of FB output is attached to the bottom 231A of the reinforcing plate 231.

As shown in FIG. 6, the pair of right and left main frames 12 are also right and left parts extended on the right side and on the left side backward from the head pipe and a reinforcing plate 235 for enhancing the coupling rigidity of the main frame 12 and the head pipe 11 is also joined to a triangular area encircled by the pair of right and left main frames 12 and the head pipe 11 by welding. The reinforcing plate 235 is located in front of and on the upside of the delay valve 108 and the joint on the side of FB input 210 and can cover and protect the second piping 107B and the first piping 86A extended forward from the delay valve 108 and the joint on the side of FB input 210 from the upside.

Figure 11:
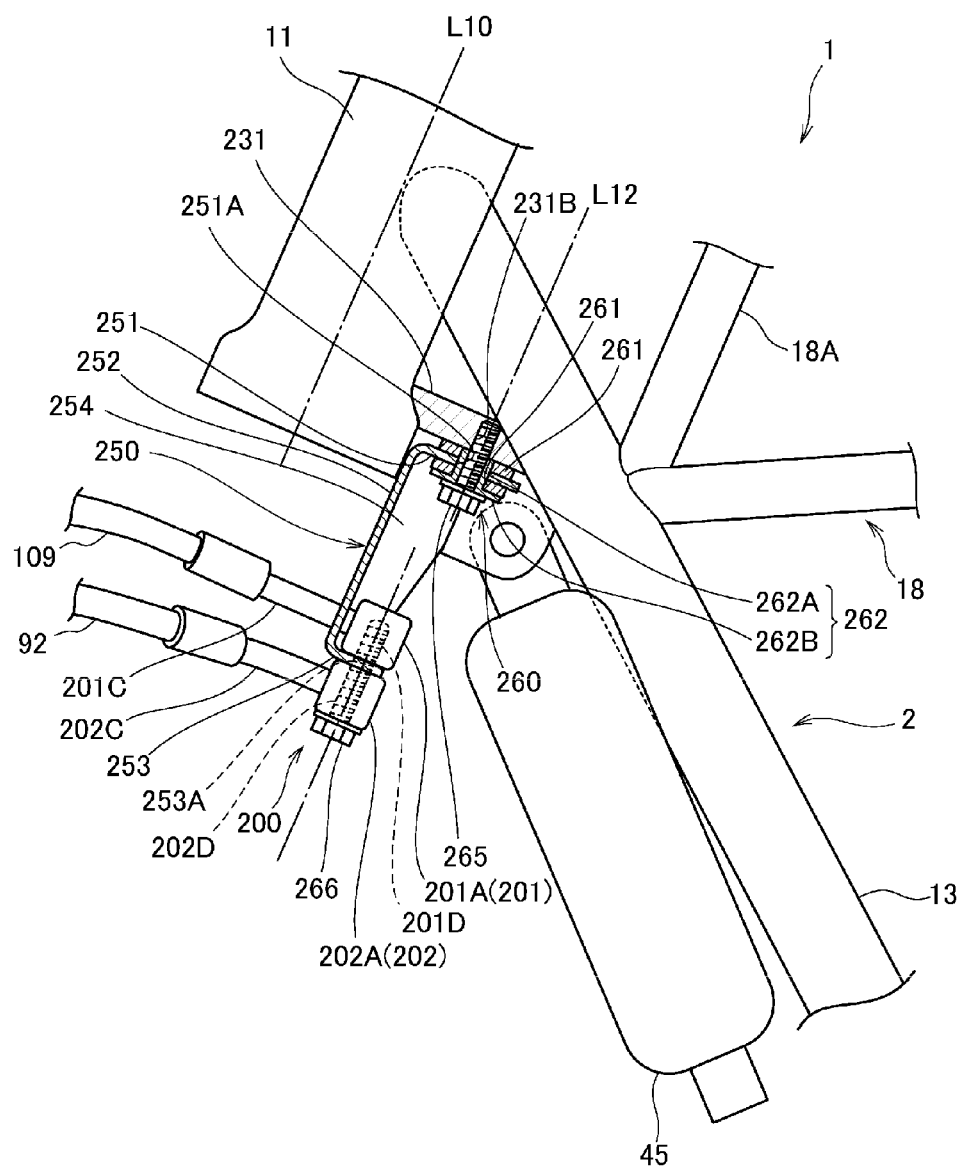
FIG. 11 is a longitudinal section showing a support stay for a joint together with its peripheral configuration.

FIG. 11 is a longitudinal section showing the support stay 250 for the joint together with its circumferential configuration.

The support stay 250 for the joint is formed by bending a metal plate, and is integrally provided with a fixed plate part 251 fixed to the bottom 231A of the reinforcing plate 231 via a mount rubber 260, a front plate part 252 substantially vertically bent from a front end of the fixed plate part 251, extended forward and downward and forming a front plate, a lower plate part 253 substantially vertically bent backward from a lower end of the front plate part 252 and forming a lower plate and a side plate part 254 bent backward from side edge on the side of one end (on the right side) in the direction of vehicle width of the front plate part 252 and forming a side plate.

The fixed plate part 251 forms an upper plate part of the support stay 250 for the joint, a single opening 251A vertically bored is provided to the fixed plate part 251, and cylindrical mount rubber 260 that functions as an elastic member is held in the opening 251A.

The mount rubber 260 is provided with plural elastic washers (two rubber washers in this configuration) 261 formed by elastic material and a cylindrical collar 262 formed by rigid material such as metal and resin and inserted into a hole of the elastic washer 261. The cylindrical collar 262 is provided with a cylinder 262A inserted into the hole of the elastic washer 261 and the opening 251A of the fixed plate part 251 and a large-diameter flange 262B provided on the side of one end of the cylinder 262A, the cylinder 262A is formed in the similar or shorter length to/than total thickness when all the elastic washers 261 and the fixed plate part 251 are laminated, and the length is equivalent to length that permits the elastic deformation of the elastic washer 261. The flange 262B is formed to have an outside diameter in which the plural elastic washers 261 put on the cylinder 262A and the fixed plate part 251 do not fall out.

As shown in FIG. 11, the elastic washers 261 and the fixed plate part 251 are installed on the cylinder 262A of the cylindrical collar 262 to laminate the fixed plate part 251 of the support stay 250 for the joint between the elastic washers 261, a fastening member (a fastening bolt in this configuration) 265 is inserted from the side of the flange 262B of the cylindrical collar 262, and the fastening member is fastened into a female tapped hole 231B provided to the reinforcing plate 231. Hereby, the fixed plate part 251 is fixed to the reinforcing plate 231 via the elastic washer 261, that is, the joint 200 on the side of FB output is mounted in a floating state off the body frame 2.

In this case, as the fixed plate part 251 is arranged between the elastic washers 261, the fixed plate part 251, that is, the support stay 250 for the joint can be relatively moved in reciprocating directions along an axis L12 of the fastening member 265 for the body frame 2 by the elastic deformation of each elastic washer 261. The number of the elastic washers 261 is not limited to two and may be also changed according to various conditions such as a target relative amount of movement and the thickness of one elastic washer 261.

In the meantime, as the fixed plate part 251 is fixed to the reinforcing plate 231 via the rigid cylindrical collar 262 and the fastening member 265 in a direction perpendicular to the axis L12 of the fastening member 265, the support stay 250 for the joint is rigidly mounted in the direction and the relative movement of the support stay 250 for the joint in the direction is regulated.

A pair of upper and lower joint members 201, 202 forming the joint 200 on the side of FB output are fixed to the lower plate part 253 as shown in FIG. 11.

To explain in detail, though the pair of upper and lower joint members 201, 202 are common in that each joint member is provided a body 201A, 202A in the shape of a rectangular parallelopiped of the joint member, a single side input pipe 201B, 202B provided on one side (on the right side) in the direction of vehicle width of the body 201A, 202A of the joint member, a single forward output pipe 201C, 202C provided on the front side of the vehicle and a hole 201D, 202D vertically extended in the body 201A, 202A of the joint member, the hole 201D of the upper joint member 201 is formed in the shape of a female tapped hole and the hole 202D of the lower joint member 202 is formed in the shape of a simple through hole.

Therefore, as shown in FIG. 11, the lower plate part 253 is held between the pair of upper and lower joint members 201, 202 by sequentially inserting a single fastening member (a fastening bolt in this configuration) 266 into the hole 202D of the lower joint member 202 and a through hole 253A provided to the lower plate part 253 from the downside and fastening it to the hole 201D of the upper joint member 201 and the pair of upper and lower joint members 201, 202 can be fixed to the support stay 250 for the joint with simple structure. A reference sign 271 in FIG. 8 denotes a detent attached across the front faces of the joint members 201, 202 for the detent of the joint members 201, 202.

The second piping 107B which is a metal pipe is connected to the side input pipe 201B of the upper joint member 201 and the piping 109 which is a flexible brake hose is connected to the forward output pipe 201C. As the forward output pipe 201C is extended forward with the forward output pipe perpendicular to the axis L10 of the head pipe 11 from the body 201A of the joint member as shown in FIG. 8, the piping 109 connected to the forward output pipe 201C can be arranged with the piping directed forward and can be connected to the front wheel brake 101 (the brake caliper 122) located in front of the joint member 201 with the piping gently curved toward the brake for the front wheel.

Besides, the piping 91 which is a metal pipe is connected to the side input pipe 202B of the lower joint member 202 and the piping 92 which is a flexible brake hose is connected to the forward output pipe 202C. As the forward output pipe 202C is also extended forward with the forward output pipe perpendicular to the axis L10 of the head pipe 11 like the forward output pipe 201C as shown in FIG. 8, the piping 92 connected to the forward output pipe 202C can be connected to the front wheel brake 101 (the brake caliper 122) located in front of the joint member 202 with the piping gently curved toward the brake for the front wheel.

In this configuration, as shown in FIG. 8, as the upper and lower forward output pipes 201C, 202C are provided in the vicinity of a center line in the direction of vehicle width coincident with the axis L10 of the head pipe 11 in a front view, distance between each forward output pipe 201C, 202C and the front wheel brake 101 provided to the front wheel 19 can be substantially equalized in the lateral direction when the front wheel 19 is laterally steered and the pipings 109, 92 which are a flexible brake hose can be easily routed.

As shown in FIG. 8, the side plate part 254 is extended between the second piping 107B and the piping 91 which are respectively a metal pipe connected to the joint 200 on the side of FB output and the head pipe 11, the support stay 250 for the joint is L-type in a horizontal cross section, and the rigidity of the support stay 250 itself is enhanced.

As shown in FIG. 11, as the axis L12 that coincides with a fastening axis of the fastening member 265 that fixes the support stay 250 for the joint to the body frame 2 is parallel to the axis L10 of the head pipe 11, access to the fastening member 265 is easy as shown in FIG. 7 in the view in the axial direction of the head pipe 11.

Besides, as for the fastening member 266 that fixes the upper and lower joint members 201, 202 to the support stay 250 for the joint, as shown in FIGS. 11 and 7, as the axis L13 that coincides with its fastening axis is also parallel to the axis L10 of the head pipe 11 and is formed in a position apart in the longitudinal direction and in the lateral direction from the axis L12 of the fastening member 265, access to the fastening member 266 is also easy. Accordingly, various work such as work for detaching the joint 200 on the side of FB output can be facilitated.

As the axial direction of the head pipe 11 coincides with a direction of a telescopic motion of the front fork 24 when the axes L12, L13 of the fastening members 265, 266 are parallel to the axis L10 of the head pipe 11, it coincides with the direction of the vertical motion of the front of the vehicle body, and the fastening strength of the joint 200 on the side of FB output can be efficiently secured by these fastening members 265, 266. In this case, the axis (=the axis L12) of the mount rubber 260 is also parallel to the axis L10 of the head pipe 11, the vibration in a vertical direction of the vehicle of the joint 200 on the side of FB output can be efficiently inhibited by the mount rubber 260, and a vibration absorption characteristic can be easily adjusted by adjusting the thickness of the mount rubber 260.

Figure 12:
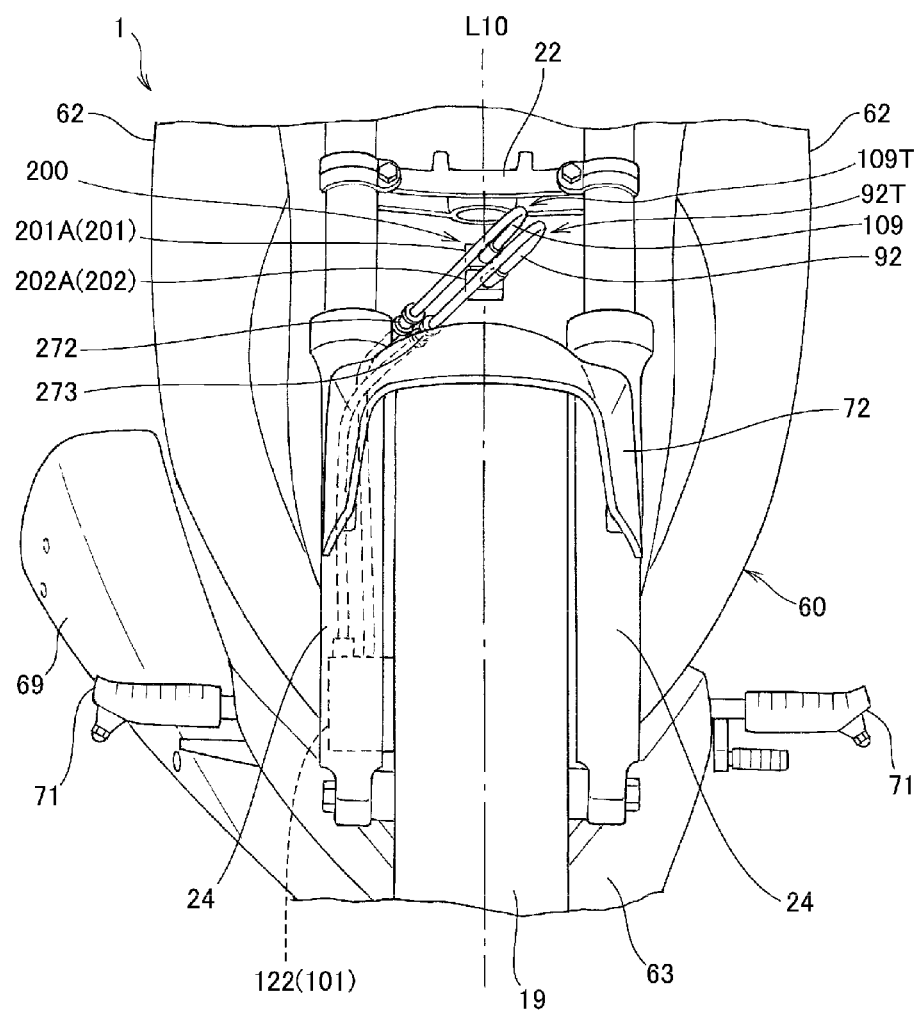
FIG. 12 is a front view showing brake hose.

FIG. 12 shows the brake hoses (the pipings 109, 92) viewed from the front side of the vehicle body. As shown in FIGS. 12 and 3, the pipings 109, 92 are curved after the pipings are extended forward toward the left side which is the opposite side to the brake caliper 122 in the direction of vehicle width, forming curved parts 109T, 92T projected forward toward the downside on the right side inside the left front fork 24 in the direction of vehicle width, the pipings are curved downward after they are pulled backward inside the right front fork 24 in the direction of vehicle width, and the pipings are connected to the brake caliper 122.

These pipings 109, 92 are fixed to a support stay (not shown) fixed to the front fork 24 via each piping holding member (for example, a grommet) 272 in each location inside the right front fork 24.

Therefore, when the front fork 24 is vertically extended or retracted for the vehicle body, the curved parts 109T, 92T projected forward are deformed in accordance with the telescopic motion. As these curved parts 109T, 92T are projected forward, are directed rightward after they are directed leftward from the joint 200 on the side of FB output and are fixed on the right side of the vehicle body, the piping length of the curved parts 109T, 92T can be efficiently secured and the curved parts can easily follow the above-mentioned telescopic motion.

As described above, in the embodiment, as the joint 200 on the side of FB output is mounted in the vicinity of the body frame 2 via the mount rubber 260 which is an elastic member in a floating state, displacement between a pair of the second piping 107B and the piping 91 which are respectively a metal pipe connected to the joint 200 on the side of FB output and a pair of the pipings 109, 92 which are respectively a flexible brake hose can be absorbed by the elastic deformation of the mount rubber 260, and a load that acts on the joint 200 on the side of FB output because of the vibration of the vehicle body can be reduced.

In addition, in this configuration, as the ABS modulator 88 is mounted in a floating state, both the ABS modulator 88 and the joint 200 on the side of FB output are mounted in a floating state off the body frame 2, the whole braking device 80 can be detached from the vibration of the body frame 2, and a load that acts on each part of the braking device 80 can be efficiently reduced. If the load that acts on each part of the braking device 80 can be reduced as described above, lightening and the reduction of the costs can be realized by the quantity.

Besides, in this configuration, as the joint 200 on the side of FB output connects plural pairs (two pairs in the embodiment) of the metal pipe (the second piping 107B, the pining 91) and the brake hose (the pipings 109, 92), the joint is held by the single support stay 250 for the joint and the single mount rubber 260 is provided between the support stay 250 for the joint and the body frame 2, the support stay and the mount rubber can be shared by the plural pairs of the metal pipe and the brake hose and the number of parts can be reduced.

In addition, in this configuration, as the joint 200 on the side of FB output is fixed to the body frame 2 by the fastening member 265 extended in parallel with the axis L10 vertically extended of the head pipe 11, the mount rubber 260 relatively movably supports the joint 200 on the side of FB output in reciprocating directions along the axis L12 of the fastening member 265 and the relative movement is regulated in a direction perpendicular to the axis L12 of the fastening member 265, the joint 200 on the side of FB output is fixed by support structure that the relative displacement of the body frame 2 in the vertical direction of the vehicle is permitted by the mount rubber 260 and the relative displacement that varies distance between the joint 200 on the side of FB output and the steering unit 20 of the body frame 2 in plane directions (in the longitudinal direction and in the lateral direction) is not permitted.

According to the support structure, the braking device 80 can be detached from the vertical vibration of the body frame 2, when the steering unit 20 is steered, a position of the joint 200 on the side of FB output which is a base of the brake hoses (the pipings 109, 92) is unchanged for the steering unit 20, and the brake hose can be set to short length, suitably separating the brake hose and the steering unit 20.

Besides, in this configuration, as the joint 200 on the side of FB output is arranged on the downside of the steering stem 21 which is the rotational center of the steering unit 20, ease of the layout of the brake hoses (the pipings 109, 92) from the joint 200 on the side of FB output is enhanced, the interference with the front fork 24 is reduced, and the brake hose can be set to short length.

In addition, in this configuration, as the reinforcing plate 231 is provided to the triangular area encircled by the down frames 13 which are right and left backward extended parts extended on the right side and on the left side backward from the head pipe 11 and the head pipe 11 and the joint 200 on the side of FB output is fixed to the reinforcing plate 231, the joint 200 on the side of FB output can be fixed in the vicinity of the head pipe 11 without increasing the number of parts.

As the brake hoses (the pipings 109, 92) connected to the joint 200 on the side of FB output are extended in a direction perpendicular to the axis L10 of the head pipe 11, the joint 200 on the side of FB output and bases of the brake hoses can be arranged possibly near to the head pipe 11 and the whole vehicle can be compacted.

Besides, in this configuration, as the pipings 91, 107 which are a metal pipe are locked to the body frame 2 by the locking member 215 made of resin, relative displacement between the body frame 2 and the metal pipe can be absorbed by the locking member 215 more flexible than the metal pipe to some extent and a load on the metal pipe can be reduced. Therefore, the metal pipe can be thinned and the metal pipe can be lightened.

In addition, in this configuration, as the delay valve 108 that adjusts the operating timing of the front wheel brake 101 is provided and the delay valve 108 is fixed to the arm-shaped support stay 221 extended backward from the reinforcing plate 231, the delay valve 108 can be fixed utilizing the reinforcing plate 231.

Further, as the axis L11 of the fastening member 223 that fixes the delay valve 108 to the support stay 221 passes inside the body frame 2 in the view in the axial direction of the head pipe 11, access to the fastening member 223 is facilitated, work for detaching the delay valve 108 is facilitated, the ease of assembly is enhanced, and the productivity is enhanced.

The above-mentioned embodiment merely shows one embodiment of the invention and the invention may be arbitrarily transformed and applied in a scope that does not deviate from the object of the invention.

For example, in the above-mentioned embodiment, the case that the invention is applied to the single disc type front wheel brake 101 is described, however, the invention is not limited to the case, and the invention may be also applied to a double disc brake type in which the front wheel brake 101 is arranged on the right side and on the left side of the front wheel 19.

Besides, in the above-mentioned embodiment, the case that the invention is applied to the braking device of the motorcycle 1 shown in FIG. 1 is described, however, the invention is not limited to the case, and the invention can be widely applied to a braking device of a saddle-ride type vehicle. The saddle-ride type vehicle includes the whole vehicle for a rider to ride and includes not only a motorcycle (also including a motorbike) but a three-wheeled vehicle and a four-wheel vehicle classified into an all terrain vehicle (ATV).

REFERENCE SIGNS LIST

1 Motorcycle (Saddle-ride type vehicle)
2 Body frame
11 Head pipe
13 Down frame (Backward extended part)
19 Front wheel
20 Steering unit
21 Steering stem
22 Lower bridge member
24 Front fork
26 Rear wheel
26A Rear axle
35 Swing arm
81 Brake lever (Brake operating member)
84 Master cylinder on side of pedal
91, 107 (107A, 107B) Front wheel output brake piping (Metal pipe)
92, 109 Front wheel output brake piping (Brake hose)
101 Front wheel brake
108 Delay valve (Brake control device for front wheel)
200 Joint on side of output to brake for front wheel (Joint on side of FB output)
250 Support stay for joint
260 Mount rubber
213, 223, 265, 266 Fastening member
215 Locking member
221 Support stay
231 Reinforcing plate
L10 to L13 Axis

The invention claimed is:

1. A braking device of a saddle-ride type vehicle comprising:
a head pipe;
a body frame;
a steering unit steerably supported by the body frame;
a front wheel rotatably supported by the steering unit;
a front wheel brake that brakes the front wheel;
an ABS modulator that is mounted in a floating state off the body frame and controls the braking force of the front wheel brake; and
a front wheel brake piping that connects the ABS modulator and the front wheel brake, the front wheel brake piping including:
a metal pipe connected to the ABS modulator;
a flexible brake hose connected to the front wheel brake; and
a joint that is supported by the body frame and connects the metal pipe and the brake hose,
wherein the joint is mounted in a floating state off the body frame via an elastic member, and fixed by a support structure,
such that a relative displacement of the joint with respect to the body frame in a direction parallel to an axis of the head pipe of the vehicle is permitted by the elastic member, and
a relative displacement of the body frame in directions perpendicular to the axis of the head pipe that varies a distance between the joint and the steering unit is not permitted,
wherein the steering unit is provided with:
a steering stem rotatably supported by the head pipe provided to a front end of the body frame;
wherein the joint is fixed to a downside of the steering stem.

2. The braking device of the saddle-ride type vehicle according to claim 1, wherein the joints connects a plurality of pairs of the metal pipe and the brake hose, the joint is held by a single support stay, and the elastic member is provided between the support stay and the body frame.

3. The braking device of the saddle-ride type vehicle according to claim 1, wherein the joint is fixed to the body frame by a first fastening member extending in parallel with the axis of the head pipe which is provided to a front end of the body frame, and
a radial direction of the elastic member extends in a direction perpendicular to the axis of the head pipe.

4. The braking device of the saddle-ride type vehicle according to claim 1,
wherein the steering unit is also provided with:
a bridge member fixed to the steering stem; and a pair of right and left front forks that are fixed to the bridge member and support the front wheel.

5. The braking device of the saddle-ride type vehicle according to claim 1,
wherein: the body frame is provided with right and left backward extended parts extended on a right side and on a left side backward from the head pipe;
a plate is provided in a triangular area encircled by the right and left backward extended pipe and the head pipe, and the joint is fixed to the plate.

6. The braking device of the saddle-ride type vehicle according to claim 5, wherein the joint is suspended from the body frame in parallel with the axis of the head pipe, and the brake hose connected to the joint is extended in a direction perpendicular to the axis of the head pipe.

7. The braking device of the saddle-ride type vehicle according to claim 1, wherein the metal pipe is locked to the body frame by a locking member made of resin.

8. The braking device of the saddle-ride type vehicle according to claim 5, comprising:
a front wheel brake control device that adjusts an operating timing of the front wheel brake,
wherein the front wheel brake control device is fixed to an arm-shaped support stay extended backward from the plate.

9. The braking device of the saddle-ride type vehicle according to claim 8, comprising:
a second fastening member that fixes the front wheel brake control device to the support stay,
wherein an axis of the second fastening member passes inside the body frame in a view in an axial direction of the head pipe.

10. The braking device of the saddle-ride type vehicle according to claim 2, wherein the joint is fixed to the body frame by a first fastening member extending in parallel with an axis of the head pipe which is provided to a front end of the body frame, and
a radial direction of the elastic member extends in a direction perpendicular to the axis of the head pipe.

11. The braking device of the saddle-ride type vehicle according to claim 3,
wherein the steering unit is also provided with:
a bridge member fixed to the steering stem; and
a pair of right and left front forks that are fixed to the bridge member and support the front wheel.

12. The braking device of the saddle-ride type vehicle according to claim 2, wherein the metal pipe is locked to the body frame by a locking member made of resin.

13. The braking device of the saddle-ride type vehicle according to claim 3, wherein the metal pipe is locked to the body frame by a locking member made of resin.

14. A braking device of the saddle-ride type vehicle, comprising:
a body frame;
a steering unit steerable supported by the body frame;
a front wheel rotatably supported by the steering unit;
a front wheel brake that brakes the front wheel;
an ABS modulator that is mounted in a floating state off the body frame and controls the braking force of the front wheel brake; and
a front wheel brake piping that connects the ABS modulator and the front wheel brake, the front wheel brake piping including:
a metal pipe connected to the ABS modulator;
a flexible brake hose connected to the front wheel brake; and
a joint that is supported by the body frame and connects the metal pipe and the brake hose,
wherein the steering unit includes a steering stem, and
the joint is mounted in a floating state off the body frame via an elastic member, and fixed by a support structure, such that a relative displacement of the joint with respect to the body frame in a direction parallel to an axis of the steering stem is permitted by the elastic member, and
a relative displacement of the body frame in directions perpendicular to the axis of the steering stem that varies a distance between the joint and the steering stem is not permitted,
wherein the steering stem is rotatably supported by a head pipe provided at a front end of the body frame;
wherein the steering unit also includes:
a bridge member fixed to the steering stem; and
a pair of right and left front forks that are fixed to the bridge member and support the front wheel, and
wherein the joint is fixed downwardly with respect the steering stem.

15. The braking device of the saddle-ride type vehicle according to claim 14,
wherein the joints connects a plurality of pairs of the metal pipe and the brake hose,
the joint is held by a single support stay, and
the elastic member is provided between the support stay and the body frame.

16. The braking device of the saddle-ride type vehicle according to claim 14,
wherein the joint is fixed to the body frame by a first fastening member extending in parallel with the axis of a head pipe which is provided to a front end of the body frame, and
a radial direction of the elastic member extends in a direction perpendicular to the axis of the head pipe.

17. The braking device of the saddle-ride type vehicle according to claim 14, wherein the metal pipe is locked to the body frame by a locking member made of resin.

18. The braking device of the saddle-ride type vehicle according to claim 14, comprising:
a front wheel brake control device that adjusts an operating timing of the front wheel brake,
wherein the front wheel brake control device is fixed to an arm-shaped support stay extended backward from the plate.

* * * * *